United States Patent
Higuchi et al.

(10) Patent No.: US 7,353,426 B2
(45) Date of Patent: Apr. 1, 2008

(54) SWITCHER FOR DEBUGGING AND DEBUGGING METHOD

(75) Inventors: Masao Higuchi, Kanagawa (JP); Masanori Takano, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 539 days.

(21) Appl. No.: 11/087,502

(22) Filed: Mar. 24, 2005

(65) Prior Publication Data
US 2005/0223298 A1 Oct. 6, 2005

(30) Foreign Application Priority Data
Mar. 25, 2004 (JP) .............................. 2004-090033

(51) Int. Cl.
*G06F 11/00* (2006.01)
(52) U.S. Cl. ................................ 714/30; 714/27; 710/2
(58) Field of Classification Search .................... 710/2, 710/38; 714/27, 30
See application file for complete search history.

(56) References Cited

U.S. PATENT DOCUMENTS

| 4,794,520 A * | 12/1988 | Kobus et al. ............... 710/107 |
| 6,295,519 B1 * | 9/2001 | Wagner et al. ................ 703/25 |
| 6,564,275 B1 * | 5/2003 | Chen .......................... 710/107 |
| 6,779,157 B2 | 8/2004 | Kondo |
| 6,892,248 B2 * | 5/2005 | Thayer ........................... 710/2 |
| 2003/0120970 A1 * | 6/2003 | Chen ............................ 714/25 |
| 2003/0120977 A1 * | 6/2003 | Tang ............................ 714/38 |
| 2004/0049611 A1 * | 3/2004 | Kotlow et al. ................ 710/38 |

FOREIGN PATENT DOCUMENTS

| JP | 4-278646 A | 10/1992 |
| JP | 6-324906 A | 11/1994 |
| JP | 2000-276370 A | 10/2000 |

\* cited by examiner

*Primary Examiner*—Robert Beausoliel
*Assistant Examiner*—Philip Guyton
(74) *Attorney, Agent, or Firm*—Foley & Lardner LLP

(57) ABSTRACT

Communication between an application program running on an information processing apparatus and a peripheral device and the communication between the information processing apparatus and a debugging device, used for debugging, is effected using a sole interface provided on the information processing apparatus. A switcher for debugging, including terminals 17a to 17c, connected to a cable 7, terminals 18a to 18c, connected to a cable 8, a terminal 16a, connected to a cable 6, a controller 41 connected to terminals 17a, 17b for command and to terminals 18a, 18b for command, and a switch unit 43 connected to the terminal for test 17c, terminal for test 18c and to the terminal 16a, is used. Based on input information 51, from one of the terminals for command 17a and 18b, the controller 41 outputs output information 52 to the other of the terminals for command 17a and 18b, while also outputting control information 57. Based on the control information, switch unit 43 connects one of the terminal for test 17c and the terminal 16a to the terminal for test 18c.

11 Claims, 11 Drawing Sheets

SWITCHER FOR DEBUGGING AND DEBUGGING METHOD

FIELD OF THE INVENTION

This invention relates to a switcher for debugging and a debugging method pertinent to a debugging system for a program executed on an information processing apparatus. More particularly, it relates to a switcher for debugging and a debugging method pertinent to a debugging system configured for debugging a program from an external debugging apparatus over an interface.

BACKGROUND OF THE INVENTION

In debugging a program executed on an information processing apparatus, such as CPU, from an external debugging apparatus, it is necessary to interconnect the information processing apparatus and the debugging device in some way or other. Such an interconnection method, employing a variety of serial interfaces, provided on the information processing apparatus, is easy to handle and economical, because there is no necessity of newly providing a special interface dedicated to debugging. It is however impossible for a program being debugged to use an interface used for debugging.

The configuration shown for example in FIG. 1 has so far been known as a technique to combat this inconvenience. FIG. 1 depicts a block diagram showing an illustrative configuration for debugging a program being run on a conventional information processing apparatus. The configuration shown includes an information processing apparatus 101, a peripheral device 102, a debugging device 103, and cables 106, 107. It is assumed here that debugging is carried out on the debugging device 103 for a system in which the information processing apparatus 101 and the peripheral device 102 are interconnected over a serial interface 111 and in which data communication 121 pertinent to an application program being run on the information processing apparatus 101 is carried out between the information processing apparatus and the peripheral device.

The information processing apparatus 101 includes memory 130, loaded with a subject of debugging, a CPU (central processing unit) 133, a serial interface 111 and another serial interface 112. The memory 130 has stored therein an application program 131 being debugged and a monitor program 132 for executing commands issued by the debugging device 103. The CPU 133 executes the programs. The serial interface 111 is connected to the memory 130, while being connected over cable 106 to the peripheral device 102. The serial interface 112 is connected to the memory 130, while being connected over cable 107 to the debugging device 103. This debugging device 103 includes software which is an information processing apparatus dedicated to debugging (debugger 135). It is noted that the debugging device 103 and the debugger 135 thereof may be implemented by hardware. A serial interface 113 is connected to the debugger 135, while being connected over cable 107 to the information processing apparatus 101.

The debugging device 103 and the information processing apparatus 101 are interconnected via serial interface 113—cable 107—serial interface 112 to effect data communication 122 pertinent to debugging (control of program execution and status referencing). The operation control and status referencing is carried out by software setting using a monitor program 132 loaded in the information processing apparatus 101. In this case, an additional serial interface 112 needs to be loaded separately on the information processing apparatus 101.

In case it is impossible to provide a serial interface for debugging on the information processing apparatus 101, the configuration shown in FIG. 2 is used. FIG. 2 depicts another conventional illustrative configuration for program debugging operating on an information processing apparatus. In such case, it is necessary to use a mechanism for controlling the CPU 133 in a hardware fashion, such as by an in-circuit emulator (ICE) 104, as a mechanism for controlling the CPU 133, in place of employing the monitor program 132 and the serial interface 112. An interface dedicated to debugging 112a (and a cable 108) need to be provided for interconnecting the ICE 104 and the CPU 133.

In the cases of FIGS. 1 and 2, an interface for debugging needs to be newly provided to the information processing apparatus 101 (the serial interface 112 provided for debugging in FIG. 1 or the interface dedicated to debugging 113 in FIG. 2). As a result, the information processing apparatus 101 needs to be provided with a controller IC, a connector or circuitry for interfacing for debugging with additional costs for the hardware forming the information processing apparatus 101. Moreover, the CPU 133 needs to be provided with connection terminals and functions of an interface dedicated to debugging or additional serial interfacing, with the result that the number of terminals of the chip of the CPU 133 used is correspondingly increased.

Such interface or mechanism is unneeded for the information processing apparatus 101 from the perspective of inherent application and represents redundant costs. It is therefore desirable for a sole interface to be co-used by the application program and the peripheral device 102 on the information processing apparatus 101 and by the debugging device 103.

As a relevant technique, the technique of a single chip micro-computer is disclosed in the JP Patent Kokai Publication No. JP-A-06-324906. This single chip micro-computer has the function of selecting between the single chip micro-computer mode and the debug mode. The single chip micro-computer includes (a) EA/ terminal state storage means for storing the state of the EA/ terminal during the resetting, at the time of selection of the debugging and imparting the stored information to the CPU unit of the chip as an EA/ terminal input, and (b) EA/ terminal connection switching means for switching the EA/ terminal during the debug mode to a debugging terminal of the chip. The debugging information may also be set/ read out from the EA/ terminal of the chip.

As another relevant technique, the technique of a micro-computer, an electronic device and an emulation method are disclosed in the JP patent Kokai Publication No. JP-P2000-276370A. This micro-computer includes a processor for carrying out information processing, an external bus and bus controlling means. The processor executes the commands. An emulation memory and at least another external memory may be connected to the external bus. When the emulation mode is on, the bus control means connects the processor bus to the aforementioned external bus so that the access to an internal memory of the processor is switched to the access to the emulation memory through the aforementioned external bus.

As a further pertinent technique, the technique of a piggy back chip is disclosed in the JP Patent Kokai 4-278646. This piggy back chip includes a functional terminal, equivalent to that of a target micro-computer, on a lateral or lower surface of the package, and a separate terminal for connection to a universal PROM on the upper package surface. The piggy back chip includes a function switching terminal, an inhibit circuit, a switching circuit and a stationary circuit. The function switching terminal is provided on the upper package surface for employing the separate terminal for connection to a universal PROM as a terminal for accessing an enclosed I/O port in the piggy back chip by applying a signal of an effective level. The inhibit circuit inhibits the internal CPU when a signal of an effective level is applied to the function switching terminal. The switching circuit switches the terminal for connection to a universal PROM to the aforementioned terminal for accessing the enclosed I/O port. The stationary circuit sets the terminal to an invalid level in case the function switching terminal is in an opened state.

[Patent Document 1] JP Patent Kokai Publication No. JP-A-06-324906

[Patent Document 2] JP Patent Kokai Publication No. JP-P2000-276370A

[Patent Document 3] JP Patent Kokai Publication No. JP-A-04-278646

SUMMARY OF THE DISCLOSURE

It is therefore an object of the present invention to provide a switcher for debugging and a debugging method whereby a target information processing apparatus may be tested using a sole interface provided on the information processing apparatus.

It is another object of the present invention to provide a switcher for debugging and a debugging method whereby a communication between an application program running on an information processing apparatus and a peripheral device and a communication between the information processing apparatus and a debugging device may be carried out using a sole interface provided on the information processing apparatus.

It is a further object of the present invention to provide a switcher for debugging and a debugging method whereby the above objects may be achieved under suppression of increase in the costs.

In the following, the present invention is explained using numerals and symbols employed in the best mode for carrying out the invention. These numerals and symbols are inserted in parentheses for clarifying the description of the claims and that of the best mode for carrying out the invention. These numerals and symbols are, however, not to be used for interpreting the technical scope of the invention as stated in the claims.

According to a first aspect of the present invention, a switcher for debugging is used for testing an information processing apparatus. The apparatus comprises plural first terminals (17a, 17b, 17c), plural second terminals (18a, 18b, 18c), a third terminal (16), a controller (41), and a switch unit (43). The plural first terminals (17a, 17b, 17c) are connectable to plural second conductors (7a, 7b, 7c) of a first cable (7). The plural second terminals (18a, 18b, 18c) are connectable to plural second conductors (8a, 8b, 8c) of a second cable (8). A third terminal (16a) is connectable to a third cable (6). The controller (41) is connected to first terminals for command (17a, 17b) as at least one of the plural first terminals (17a, 17b, 17c) and to second terminals for command (18a, 18b) as at least one of the plural second terminals (18a, 18b and 18c). The switching unit (43) is connected to a first terminal for test (17c) as at least one other of the plural first terminals (17a, 17b, 17c), to a second terminal for test (18c) as at least one other of the plural second terminals (18a, 18b and 18c), and to a third terminal (16). The controller (41) outputs an output information (52), based on an input information (51) from one of the first terminal for command (17a) and the second terminal for command (18b), to the other of the first terminal for command (17a) and the second terminal for command (18b), to output a control information (57) controlling the connection of the switch unit (43). The switch unit (43) connects one of the first terminal for test (17c) and the third terminal (16) to the second terminal for test (18c) based on the control information (57).

In the above-described switcher for debugging, when a first information processing apparatus (1) is tested, using a second information processing apparatus (2), involved in testing, by a test device (3), as one and the other ends of the second cable (8) are connected to the first information processing apparatus (1) being tested and to the plural second terminals (18a, 18b, 18c), respectively; one and the other ends of the first cable (7) are connected to the test device (3) and to the plural first terminals (17a, 17b, 17c), respectively; and as one and the other ends of the third cable (6) are connected to the second information processing apparatus (2) involved in testing and to the third terminal (16), the controller (41) sends the first transmission information (52), through the second terminal for command (18b) and the second cable (8), to the first information processing apparatus (1), based on the first received information (51) received from the test device (3) via first cable (7) and first terminal for command (17a), to output the first switching information (57) controlling the switching connection of the switch unit (43). The switch unit (43) connects one of the first terminal for test (17c) and the third terminal (16) to the second terminal for test (18c), based on the first switching information (57). The first received information (51) an information pertinent to the switching connection of the switch unit (43). The first transmission information (52) is an information pertinent to operation of the first information processing apparatus (1).

In testing the first information processing apparatus (1), in the above-described switcher for debugging, the controller (41) sends the second transmission information (54) through the first terminal for command (17b) and the first cable (7) to the test device (3), based on the second received information (53) received from the first information processing apparatus (1) over the second cable (8) and the second terminal for command (18a). The second received information (53) is an information representing a response to the first transmission information (52). The second transmission information (54) is an information representing a response to the second received information (53).

In the above-described switcher for debugging, when the first information processing apparatus (1) is tested, using the second information processing apparatus (2), by the test device (3), as one and the other ends of the second cable (8) are connected to the first information processing apparatus (1) being tested and to the plural second terminals (18a, 18b, 18c), respectively; one and the other ends of the first cable (7) are connected to the test device (3) and to the plural first terminals (17a, 17b, 17c), respectively; and as one and the other ends of the third cable (6) are connected to the second information processing apparatus (2) involved in testing and to the third terminal (16), respectively, the controller (41) sends the first transmission information (52), through the second terminal for command (18b) and the second cable (8), to the first information processing apparatus (1), based on the first received information (51) received from the test device (3) via first cable (7) and first terminal for command (17a). The first received information (51) is an information pertinent to switching connection of the switch unit (43). The first transmission information (52) is an information pertinent to operation of the first information processing apparatus (1).

In testing the first information processing apparatus (1), in the above-described switcher for debugging, the controller (41) sends a second transmission information (54) through the first terminal for command (17b) and the first cable (7) to the test device (3), based on the second received information (53) received from the first information processing apparatus (1) over the second cable (8) and the second terminal for command (18a), to output the first switching information (57) controlling a switching connection of the switch unit (43). The switch unit (43) connects one of the first terminal for test (17c) and the third terminal (16) to the second terminal for test (18c), based on the first switching information (57). The second received information (53) is an information representing a response to the first transmission information (52). The second transmission information (54) is an information representing a response to the second received information (53).

In the above-described switcher for debugging, when the first information processing apparatus (1) is tested, using the second information processing apparatus (2), by the test device (3), as one and the other ends of the second cable (8) are connected to the first information processing apparatus (1) being tested and to the plural second terminals (18a, 18b, 18c), respectively, one and the other ends of the first cable (7) are connected to the test device (3) and to the plural first terminals (17a, 17b, 17c), respectively, and as one and the other ends of the third cable (6) are connected to the second information processing apparatus (2), involved in testing, and to the third terminal (16), respectively, the controller (41) sends the second transmission information (54), through the first terminal for command (17b) and the first cable (7), to the test device (3), based on the second received information (53), received from the first information processing apparatus (1), over the second cable (8) and the second terminal for command (18a), to output the first switching information (57) controlling the switching connection of the switch unit (43). The switch unit (43) connects one of the first terminal for test (17c) and the third terminal (16) to the second terminal for test (18c), based on the first switching information (57). The second received information (53) is an information pertinent to the switching connection of the switch unit (43). The second transmission information (54) is an information pertinent to operation of the test device (3).

In testing the first information processing apparatus (1), in the above-described switcher for debugging, the controller (41) also sends the first transmission information (52) through the second terminal for command (18b) and the second cable (8) to the first information processing apparatus (1), based on the first received information (51) received from the test device (3) over the first cable (7) and the first terminal for command (17a). The first received information (51) is an information representing a response to the second transmission information (54). The first transmission information (52) is an information representing a response to the first received information (53).

The above-described switcher for debugging is comprised in the second information processing apparatus (3).

In a second aspect, the present invention is also directed to a debugging method for a debugging device (3) configured for debugging an information processing apparatus (1) to which a peripheral device (2) is connected. The peripheral device (2) and the debugging device (3) are connected to the information processing apparatus (1) via a switch unit (5). The information processing apparatus (1) comprises an application program (31) being debugged and a monitor program (32) for controlling the debugging in the information processing apparatus (1). The debugging device (3) comprises a debugger (35) for controlling the debugging. The switch unit (5) comprises a controller (41) for selecting one of a first connection (21) between the information processing apparatus (1) and the peripheral device (2) and a second connection (22) between the information processing apparatus (1) and the debugging device (3).

The debugging method comprises the following steps:
(a) a step of the debugger (35) in a debug mode transmitting a first request signal (51), indicating a switching connection request, to the switch unit (5), based on a start request signal indicating a request for start of operation of an application program (31);
(b) a step of the controller switching-over from a second connection (22) to a first connection (21) based on a first request signal (51);
(c) a step of the controller (41) transmitting a second request signal (52), indicating a request for execution of the application program (31), to the information processing apparatus (1);
(d) a step of the monitor program (32) starting execution of the application program (31) based on the second request signal (52);
(e) a step of the monitor program (32) transmitting a first response signal (53), indicating the start of execution of the application program (31), to the switch unit (5);
(f) a step of the controller (41) transmitting a second response signal (54), indicating switching-over, to the debugging device (3), based on the first response signal (53); and
(g) a step of the debugger (35) transferring to the program executing mode based on the second response signal (54).

The debug mode is a mode of the debugger (35) debugging the information processing apparatus (1). The program executing mode is a mode of the application program (31) being in operation.

According to a third aspect, the present invention is also directed to a debugging method comprising debugging an information processing apparatus (1), connected to a peripheral device (2), by a debugging device (3). The peripheral device (2) and the debugging device (3) are connected via a switch unit (5) to the information processing apparatus (1). The information processing apparatus (1) comprises an application program (31) being debugged and a monitor program (32) for controlling the debugging in the information processing apparatus (1). The debugging device (3) comprises a debugger (35) for controlling the debugging. The switch unit (5) comprises a controller (41) for selecting one of the first connection (21) between the information processing apparatus (1) and the peripheral device (2) and the second connection (22) between the information processing apparatus (1) and the debugging device (3).

The debugging method comprises the following steps:
(a) a step of the debugger (35) in the program executing mode transmitting a first request signal (51), indicating a switching connection request to the switch unit (5), based on a stop request signal indicating the request for stop of the application program (31);
(b) a step of the controller (41) transmitting a stop request for stopping execution of the application program (31), based on the first request signal (51);

(c) a step of the monitor program (32) stopping execution of the application program (31), based on the second request signal (52);
(d) a step of the monitor program (32) transmitting a first response signal (53), indicating stop of execution of the application program (31), to the switch unit (5);
(e) a step of the controller (41) switching from the first connection (21) to the second connection (22) based on the first response signal (53);
(f) a step of the controller (41) transmitting a second response signal (54), indicating switching-over, to the debugging device (3); and
(g) a step of the debugger (35) transferring to a debug mode based on a second response signal (54).

The debug mode is a mode of the debugger (35) debugging the information processing apparatus (1). The program executing mode is a mode of the application program (31) being in operation.

According to a fourth aspect, the present invention is also directed to a debugging method comprising debugging the information processing apparatus (1), connected to a peripheral device (2), by a debugging device (3). The peripheral device (2) and the debugging device (3) are connected via a switch unit (5) to the information processing apparatus (1). The information processing apparatus (1) includes an application program (31) being debugged and a monitor program (32) for controlling the debugging in the information processing apparatus (1). The debugging device (3) includes a debugger (35) for controlling the debugging. The switch unit (5) includes a controller (41) for selecting one of the first connection (21) between the information processing apparatus (1) and the peripheral device (2) and the second connection (22) between the information processing apparatus (1) and the debugging device (3).

The debugging method comprises the following steps:
(a) a step of the monitor program (32) transmitting a first request signal (53), indicating a switching connection request, to the switch unit (5) responsive to stop of the application program (31);
(b) a step of the controller (41) switching from the first connection (21) to the second connection (22) based on a first response signal (53);
(c) a step of the controller (41) transmitting a second request signal (54), indicating a request for mode change of the debugger (35), to the information processing apparatus (1);
(d) a step of the debugger (35) changing from a program running mode to a debug mode based on the second request signal (54);
(e) a step of the debugger (35) transmitting a first response signal (51), indicating the mode change, to the switch unit (5);
(f) a step of the controller (41) transmitting a second response signal (52), indicating the mode change, to the information processing apparatus 1, based on the first response signal (51); and
(g) a step of the monitor program (32) recognizing completion of transfer to the debug mode.

The debug mode is a mode of the debugger (35) debugging the information processing apparatus (1). The program executing mode is a mode of the application program (31) being in operation.

According to a fifth aspect, the present invention is also directed to a debugging program for having a debugging device (3) execute the method for debugging the information processing apparatus (1) connected to a peripheral device (2). The peripheral device (2) and the debugging device (3) are connected to the information processing apparatus (1) via a switch unit (5). The information processing apparatus (1) comprises an application program (31) being debugged and a monitor program (32) for controlling the debugging in the information processing apparatus (1). The debugging device (3) includes a debugger (35) for controlling the debugging. The switch unit (5) comprises a controller (41) for selecting one of a first connection (21) between the information processing apparatus (1) and the peripheral device (2) and a second connection (22) between the information processing apparatus (1) and the debugging device (3).

The debugging program comprises the following steps:
(a) a step of transmitting a first request signal (51), indicating a switching connection request, to the switch unit (5), based on a start request signal indicating the request for start of the operation of the application program (31); and
(b) a step of transferring from a debug mode to a program executing mode based on the switch unit (5) switching-over from the second connection (22) to the first connection (21) and on the start of execution of the application program (31) in the information processing apparatus (1).

The debug mode is a mode of the debugger (35) debugging the information processing apparatus (1). The program executing mode is a mode of the application program (31) being in operation.

According to a sixth aspect, the present invention is also directed to a debugging program for having the debugging device (3) execute the debugging method comprising debugging an information processing apparatus (1) connected to a peripheral device (2). The peripheral device (2) and the debugging device (3) are connected via a switch unit (5) to the information processing apparatus (1). The information processing apparatus (1) comprises an application program (31) being debugged and a monitor program (32) for controlling the debugging in the information processing apparatus (1). The debugging device (3) comprises a debugger (35) for controlling the debugging. The switch unit (5) comprises a controller (41) for selecting one of the first connection (21) between the information processing apparatus (1) and the peripheral device (2) and the second connection (22) between the information processing apparatus (1) and the debugging device (3).

The debugging program comprises the following steps:
(a) a step of transmitting a first request signal (51), indicating a switching connection request, to the switch unit 5, based on a stop request signal indicating the request for stop of the application program (31), and
(b) a step of transferring from the program executing mode to the debug mode based on a second response signal (54) transmitted from the switch unit (5) based on the cessation of execution of the application program (31) in the information processing apparatus (1) and on the switching from the first connection (21) to the second connection (22) by the switch unit (5).

The debug mode is a mode of the debugger (35) debugging the information processing apparatus (1). The program executing mode is a mode of the application program (31) being in operation.

According to a seventh aspect, the present invention is also directed to a debugging program for having the debugging device (3) execute the debugging method comprising debugging the information processing apparatus (1) connected to the peripheral device (2) by the debugging device (3). The peripheral device (2) and the debugging device (3) are connected via the switch unit (5) to the information processing apparatus (1). The information processing apparatus (1) includes an application program (31) being debugged and a monitor program (32) for controlling the debugging in the information processing apparatus (1). The debugging device (3) comprises a debugger (35) for controlling the debugging. The switch unit (5) comprises a controller (41) for selecting one of the first connection (21) between the information processing apparatus (1) and the peripheral device (2) and the second connection (22) between the information processing apparatus (1) and the debugging device (3).

The debugging program comprises the following steps:
(a) a step of transferring from a program executing mode to a debug mode based on a second request signal, indicating a mode change request, transmitted by the switch unit, based on stop of execution of the application program in the information processing apparatus; and
(b) a step of transmitting a first response signal, indicating the mode change, to the switch unit.

The debug mode is a mode of the debugger debugging the information processing apparatus, and the program executing mode is a mode of the application program being in operation.

According to an eighth aspect, the present invention is also directed to a monitor program for having an information processing apparatus (1) execute a debugging method for debugging, by a debugging device (3), the information processing apparatus (1) connected to a peripheral device. The peripheral device (2) and the debugging device (3) are connected via a switch unit (5) to the information processing apparatus (1). The information processing apparatus comprises an application program (31) being debugged and a monitor program (32) for controlling the debugging in the information processing apparatus (1). The debugging device (3) comprises a debugger (35) for controlling the debugging. The switch unit comprises a controller for selecting one of the first connection (21) between the information processing apparatus (1) and the peripheral device (2) and the second connection (22) between the information processing apparatus (1) and the debugging device (3).

The debugging program comprises the following steps:
(a) a step of starting execution of the application program (31) based on switching-over from the second connection (22) to the first connection (21) responsive to a start request signal indicating a request for start of operation of the application program in the debugging device (3); and
(b) a step of transmitting a first response signal (53), indicating start of execution of the application program (31), to the switch unit (5).

The debugging device (3) transfers from the debug mode to the program executing mode based on a second response signal (54) transmitted by the switch unit (5) responsive to the first response signal (53). The debug mode is a mode of the debugger (35) debugging the information processing apparatus (1) and the program executing mode is a mode of the application program (31) being in operation.

According to a ninth aspect, the present invention is also directed to a monitor program for having an information processing apparatus (1) execute a debugging method for debugging, by a debugging device (3), the information processing apparatus (1) connected to a peripheral device (2). The peripheral device and the debugging device are connected via a switch unit (5) to the information processing apparatus (1). The information processing apparatus (1) comprises an application program (31) being debugged and a monitor program (32) for controlling the debugging in the information processing apparatus (1). The debugging device (3) comprises a debugger (35) for controlling the debugging. The switch unit (5) comprises a controller (41) for selecting one of the first connection (21) between the information processing apparatus (1) and the peripheral device (2) and the second connection (22) between the information processing apparatus (1) and the debugging device (3).

The debugging program comprises the following steps:
(a) a step of stopping execution of the application program (31) based on a stop request signal indicating a request for stop of the application program (31) in the debugging device (3); and
(b) a step of transmitting a first response signal (53), indicating stop of execution of the application program (31), to the switch unit (5).

The debugging device transfers from the program executing mode to the debug mode based on a second response signal (54) transmitted based on the switch unit (5) transferring from the first connection (21) to the second connection (22) responsive to the first response signal (53). The debug mode is a mode of the debugger (35) debugging the information processing apparatus (1) and the program executing mode is a mode of the application program (31) being in operation.

According to a tenth aspect, the present invention is also directed to a monitor program for having an information processing apparatus (1) execute a debugging method by a debugging device (3) debugging the information processing apparatus (1) connected to a peripheral device (2). The peripheral device and the debugging device are connected via a switch unit (5) to the information processing apparatus (1). The information processing apparatus (1) comprises an application program (31) being debugged and a monitor program (32) for controlling the debugging in the information processing apparatus (1). The debugging device (3) comprises a debugger (35) for controlling the debugging. The switch unit (5) comprises a controller (41) for selecting one of the first connection (21) between the information processing apparatus (1) and the peripheral device (2) and the second connection (22) between the information processing apparatus (1) and the debugging device (3).

The debugging program comprises the following steps:
(a) a step of transmitting a first request signal, indicating a switching connection request, to the switch unit (5) responsive to stop of the application program; and
(b) a step of recognizing completion (end) of transition to the debug mode based on a second response signal (52) transmitted from the switch unit based on change from the program executing mode to the debug mode as a result of switching of the switch unit (5) from the first connection (21) to the second connection (22) in the switch unit (5) based on the first request signal (53).

The debug mode is a mode of the debugger (35) debugging the information processing apparatus (1). The program executing mode is a mode of the application program (31) being in operation.

The meritorious effects of the present invention are summarized as follows.

According to the present invention, it becomes possible to effect a communication between an application program running on an information processing apparatus and a peripheral device and a communication between the information processing apparatus and a debugging device, using a sole interface provided on the information processing apparatus. The information processing apparatus can be tested using a sole interface provided on the apparatus. These meritorious effects may be achieved without substantial increase in the cost.

PREFERRED EMBODIMENTS OF THE INVENTION

Figure 1:
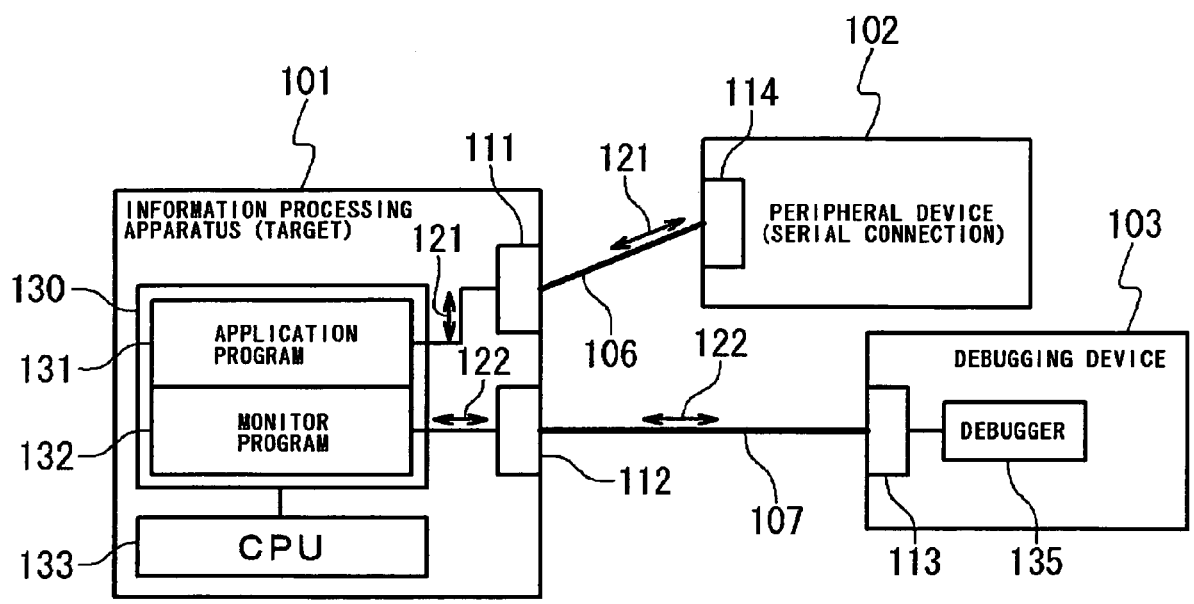
FIG. 1 is a block diagram showing an example of an illustrative configuration for debugging a program running on a conventional information processing apparatus.
Figure 2:
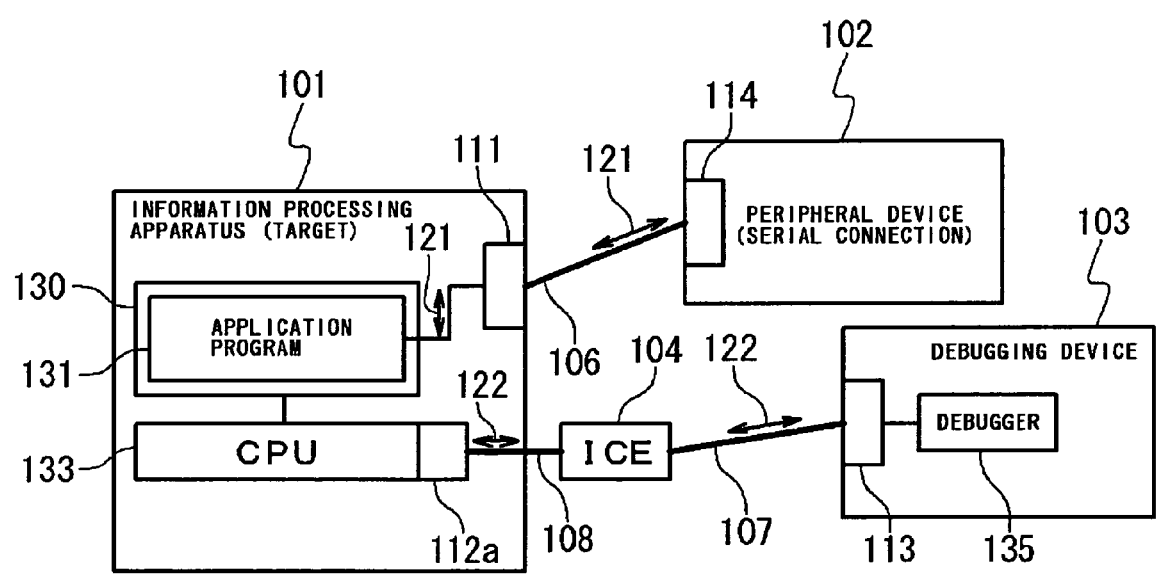
FIG. 2 is a block diagram showing another example of an illustrative configuration for debugging a program running on a conventional information processing apparatus.

Referring to the drawings, preferred embodiments of the switcher for debugging and a debugging system for employing the switcher are explained in detail.

Figure 3:
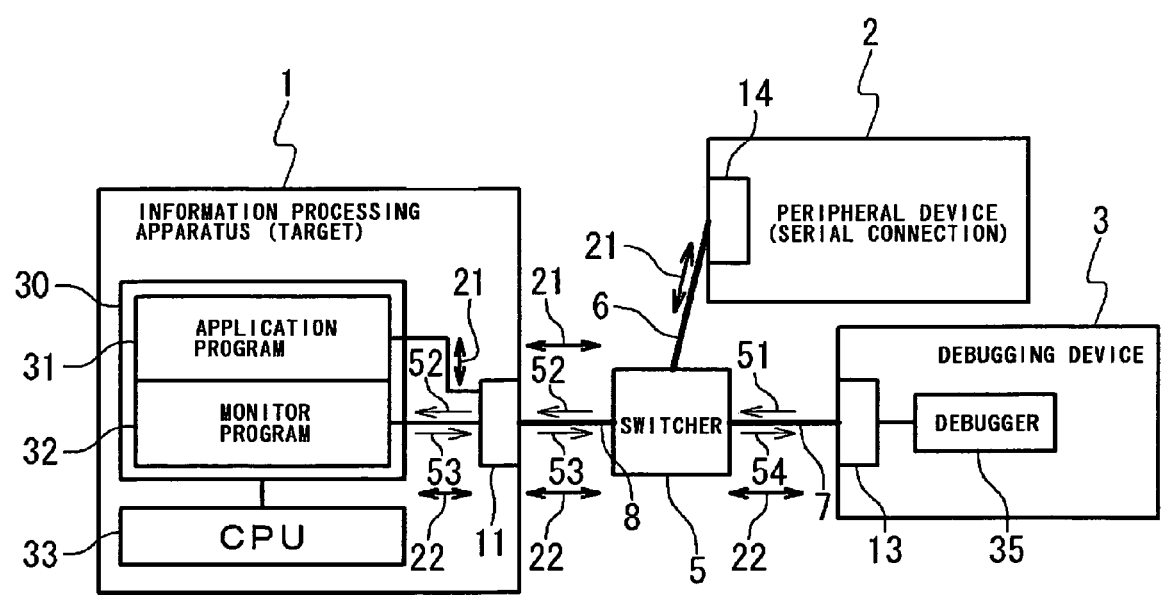
FIG. 3 is a block diagram showing the configuration of a switcher for debugging and a debugging system employing the switcher, according to the present invention.

First, referring to the drawings, the configuration of the switcher for debugging according to the present invention and the debugging system employing the switcher are explained. FIG. 3 depicts a block diagram showing a configuration of a switcher for debugging according to the present invention, and a debugging system employing the switcher. This debugging system comprises an information processing apparatus 1, a peripheral device 2, a debugging device 3, a switch unit 5 and cables 6 to 8. It is here assumed that a system in which the information processing apparatus 1 and the peripheral device 2 are interconnected via serial interface 11 and the switch unit 5 to carry out reciprocal communication 21 pertinent to the application program 31, running on the information processing apparatus 1, is to be tested (debugged). The present system carries out the debugging by the debugging device 3 connected to the information processing apparatus 1 via serial interface 11 and switch unit 5.

In the present invention, the switch unit 5 is introduced for switching-over between a first mode of data communication 21 of the application program and a second mode of communication 22 of the information pertinent to debugging. Since the switching operation of the switch unit 5 needs to be synchronized with the information processing apparatus 1 and with the debugging device 3, signals 51 to 54 for request/response of switching for synchronization, are used. In case RS-232C, commonly used as the serial interface, is used, control signal lines of RS-232C are used for signal lines for these signals 51 to 54. By so doing, two modes of the communications between that of data of the application program and that of the information pertinent to debugging may be made over the sole serial interface 11 of the information processing apparatus 1.

The information processing apparatus 1 comprises the subject (target) for debugging, and is provided with a memory 30, a CPU (central processing unit) 33 and a serial interface 11. The memory 30 has stored therein an application program 31 and a monitor program 32, and is exemplified by a ROM (read-only memory) or a RAM (random-access memory). The CPU 33 executes respective programs. The serial interface 11 is connected to the memory 30 and connected over cable 8 to the switch unit 5. The application program 31 is the subject of debugging and also carries out (first mode of) communication 21 with the peripheral device 2 as the program is executed. The monitor program 32 controls the application program 31 to execute the commands of the debugger 35 of the debugging device 3.

The switch unit 5 is connected to the information processing apparatus 1 over cable 8, while being connected to the debugging device 3 over cable 7 and connected to the peripheral device 2 over cable 6. The principal destination of connection of the information processing apparatus 1 is set to the peripheral device 2 or to the debugging device 3, based on a signal from the information processing apparatus 1 or a signal from the debugging device 3. It is noted that the connection between the information processing apparatus 1 and the debugging device 3 for the signals 51 to 54 is maintained at all times, as will be explained in detail subsequently.

The debugging device 3 comprises an information processing apparatus and includes the debugger 35 as a software setting dedicated to debugging. Meanwhile, the debugging device 3 and the debugger 35 may be implemented by hardware. The signal transmission/reception by the debugger 35 is via a serial interface 13. This serial interface 13 is connected over cable 7 to the switch unit 5.

The debugger 35 is a program for controlling the testing (debugging) carried out on the information processing apparatus 1. The debugger 35 and the information processing apparatus 1 are interconnected via serial interface 13—cable 7—switch unit 5—cable 8—serial interface 11. The debugger carries out (second mode of) communication 22 of data pertinent to debugging (program execution control or status referencing). The operation control and the status referencing by the CPU 33 is carried out by software setting by the monitor program 32 stored in the information processing apparatus 1.

The peripheral device 2 is connected to the information processing apparatus 1 via cable 6 and switch unit 5 connected to a serial interface 14. The (first mode of) communication 21 pertinent to the application program 31 operating on the information processing apparatus 1 is carried out reciprocally.

The serial interfaces 11, 13 and 14 may be exemplified by RS (recommended standard)-232C or USB (universal serial bus). In these cases, the cables 6 to 8 are RS-232C cables or USB cables. Each cable may comprise plural conductors.

Figure 4:
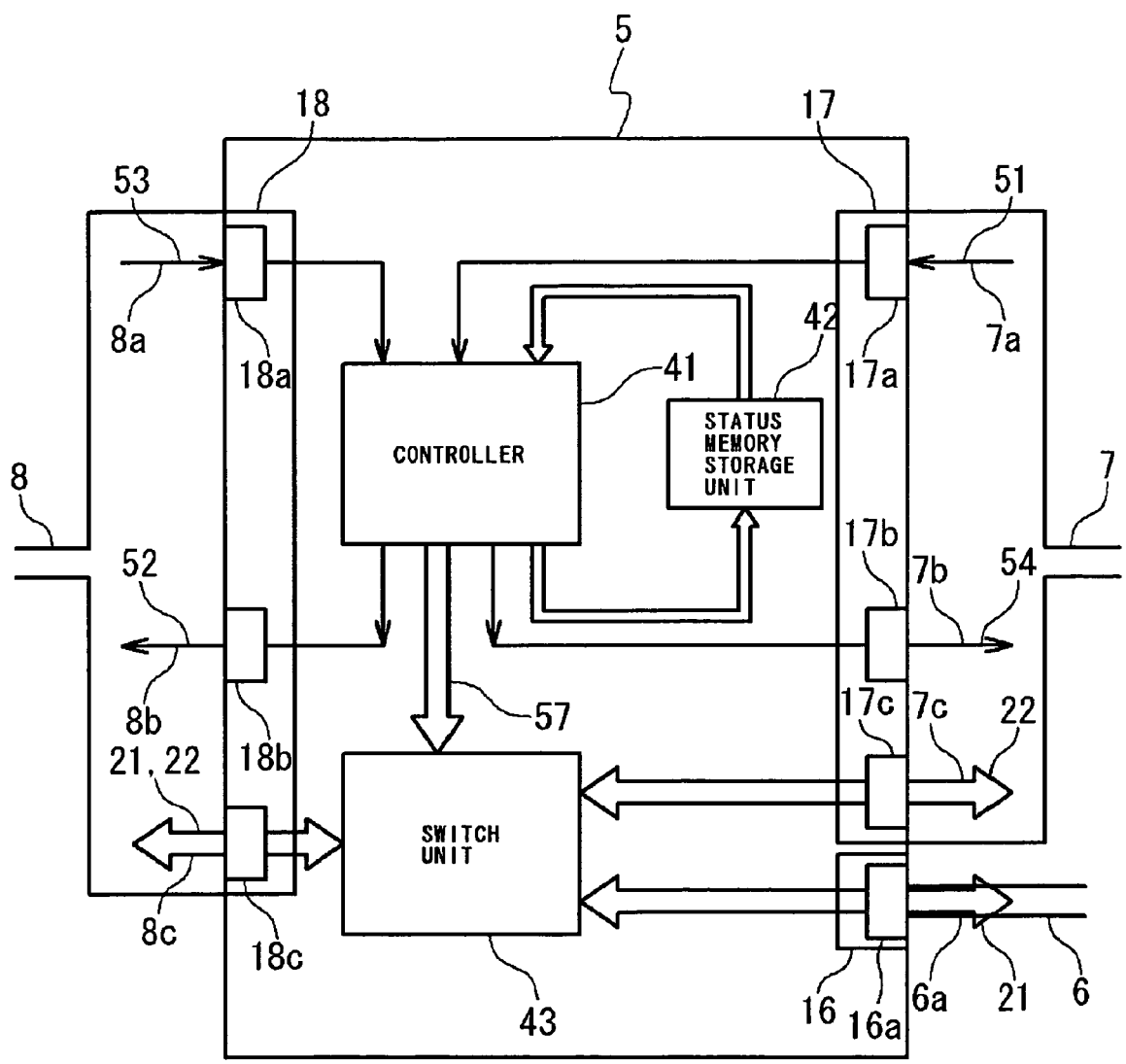
FIG. 4 is a block diagram showing the configuration of an embodiment of a switcher for debugging according to the present invention.

FIG. 4 depicts a block diagram showing an illustrative configuration of a switcher for debugging according to the present invention. The switcher 5 for debugging includes a controller 41, a status memory storage unit 42, a switch unit 43 and serial interfaces 16 to 18.

The serial interface 17 includes plural terminals 17a, 17b and 17c. These terminals may be connected to plural conductors 7a, 7b and 7c belonging to the cable 7. Although a sole terminal 17c is shown in the drawing, plural terminals may be used and, correspondingly, the conductor 7c may be made up by plural conductors. The terminals 17a and 17b may be the same terminal.

The serial interface 18 includes plural terminals 18a, 18b and 18c. These terminals 18a, 18b and 18c may be connected to plural conductors 8a, 8b and 8c belonging to the cable 8. Although a sole terminal 18c is shown in the drawing, plural terminals may be used and, correspondingly, the conductor 8c may be made up by plural conductors. The terminals 18a and 18b may be the same terminal.

The serial interface 16 includes a terminal 16a. This terminal 16a may be connected to the conductor 6a belonging to the cable 6. Although a sole terminal 16a is shown in the drawing, plural terminals may be used and, correspondingly, the conductor 6a may be made up by plural conductors.

The serial interfaces 16 to 18 may be exemplified by RS-232C or USB. The serial interfaces 16 to 18 used are the same as the serial interfaces 14, 13 and 11, respectively.

The first terminals for command 17a, 17b, out of the plural terminals 17a to 17c, and the second terminals for command 18a, 18b, out of the plural terminals 18a to 18c, are connected to the controller 41.

The memory storage unit 42 is connected to the controller 41, and stores the status information 61 output from the controller 41. The status information 61 indicates the status of each of the information processing apparatus 1 and the debugging device 3. These statuses are stored separately. The memory storage unit 42 may be exemplified by a ROM or a RAM.

The switch unit 43 is connected to the controller 41, to the first terminal for testing 17c, out of the plural terminals 17a to 17c, to the second terminal for testing 18c, out of the plural terminals 18a to 18c, and to the terminal 16. The switch unit 43 selects one of the first terminal for testing 17c and the terminal 16, based on the switching signal 57, output from the controller 41, to connect the so selected terminal to the second terminal for testing 18c.

The controller 41 outputs a signal 52 via second terminal for testing 18b to the information processing apparatus 1, based on the signal 51, received via first terminal for command 17a from the debugging device 3. The signal 51 includes the information pertinent to the status of the debugging device 3 and the information pertinent to switching-over. The controller 41 causes storage of the status information 61, indicating the status of the debugging device 3, in the memory storage unit 42, based on the information, to output the switching signal 57, controlling the connection (switching-over) of the switch unit 43, to the switch unit 43.

The controller 41 outputs a signal 54 via first terminal for command 17b to the debugging device 3, based on a signal 53 sent from the information processing apparatus 1 via second terminal for command 18a. The signal 53 includes the information pertinent to the status of the information processing apparatus 1 and the information pertinent to the switching-over. Based on this information, the controller 41 stores the status information 61, indicating the status of the information processing apparatus 1, in the memory storage unit 42, and outputs the switching information 57, controlling the connection (switching-over) of the switch unit 43, to the switch unit 43.

The controller 41 may be exemplified by the CPU.

Referring to the drawings, the operation of the switcher for debugging and the debugging system employing it (the mode of operation of the debugging method) is now explained with reference to the drawings.

Figure 5:
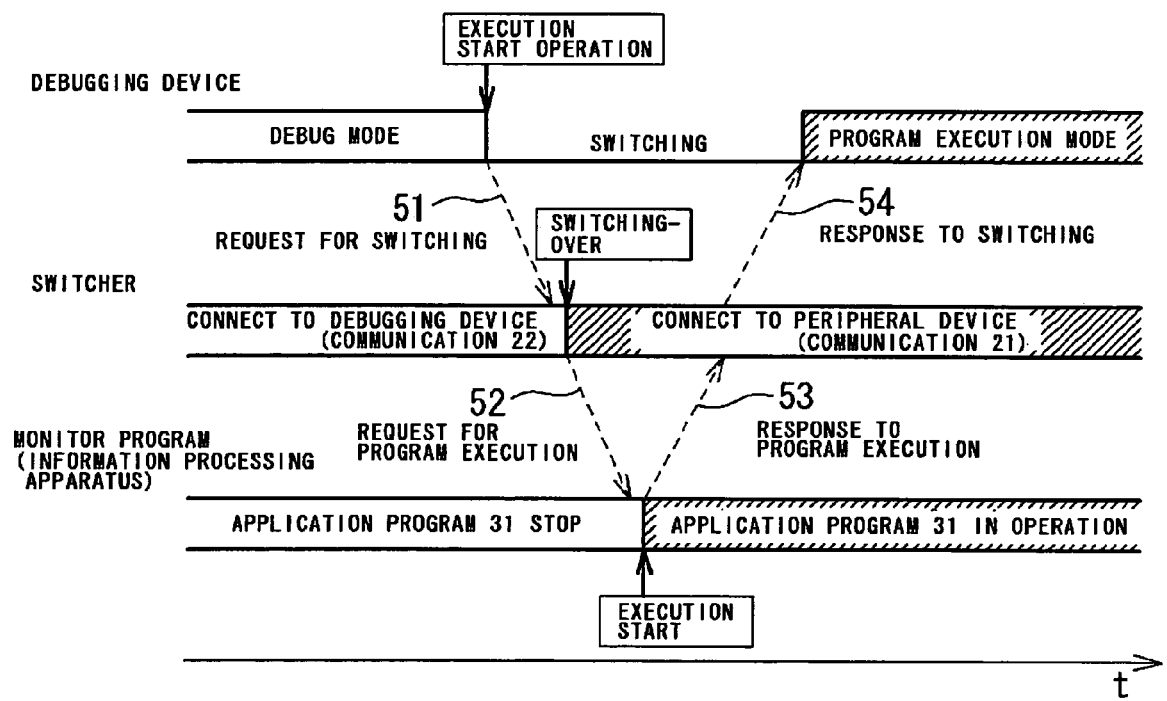
FIG. 5 is a timing chart showing the operation for transition from a debug mode to a program executing mode.

FIG. 5 depicts a timing chart for illustrating the operation of transition from the debug mode to the program executing mode. Meanwhile, the "debug mode" denotes a state in which the application program being debugged is not in operation and the debugger 35 of the debugging device 3 controls the monitor program 33 of the information processing apparatus 1 to enable the execution of the operation for information acquisition. The "program executing mode" denotes a state in which the application program 31 is in operation to enable serial communication to be carried out between the peripheral device 2 and the application program 31.

(1) In case the user has performed the operation of starting the operation of the application program 31 for the debugging device 3 ("execution start operation" in the drawing), the debugger 35 of the debugging device 3 sends a signal 51 to the switcher 35. The signal 51 denotes the switching request for switching-over of the serial communication and the status of the debugging device 3 (end of the debug mode).

(2) On receipt of the signal 51, the controller 41 of the switch unit 5 outputs the switching signal 57 to the switch unit 43 to switch-over the connection of the serial communication from the information processing apparatus 1—debugging device 3 (second mode of communication 22) to the information processing apparatus 1—peripheral device 2 (first mode of communication 21) ("switching-over" in the drawing). The controller 41 outputs a signal 52 to the information processing apparatus 1. The signal 52 denotes a request for program execution. The controller 41 causes the status of the debugging device 3 (end of the debug mode) to be stored in the status memory storage unit 42.

(3) On receipt of the signal 52, the monitor program 32 of the information processing apparatus 1 commences execution of the application program 31 ("execution start" in the drawing). The monitor program 32 transmits a signal 53 to the switch unit 5 in order to advise the debugging device 3 of the fact that execution of the application program 31 has started. The signal 53 denotes the response to the program execution start and the status of the information processing apparatus 1 ("application program 31 in operation").

(4) On receipt of the signal 53, the controller 41 of the switch unit 5 directly transmits the signal as a signal 54 to the debugging device 3. The signal 54 denotes the switching response ("response to switching"). The controller 41 stores the status of the information processing apparatus 1 ("application program 31 in operation") in the memory storage unit 42.

(5) On receipt of the signal 54, the debugger 35 of the debugging device 3 recognizes the switching of the serial communication and completion of the start of execution of the application program to transfer to the program execution mode.

Figure 6:
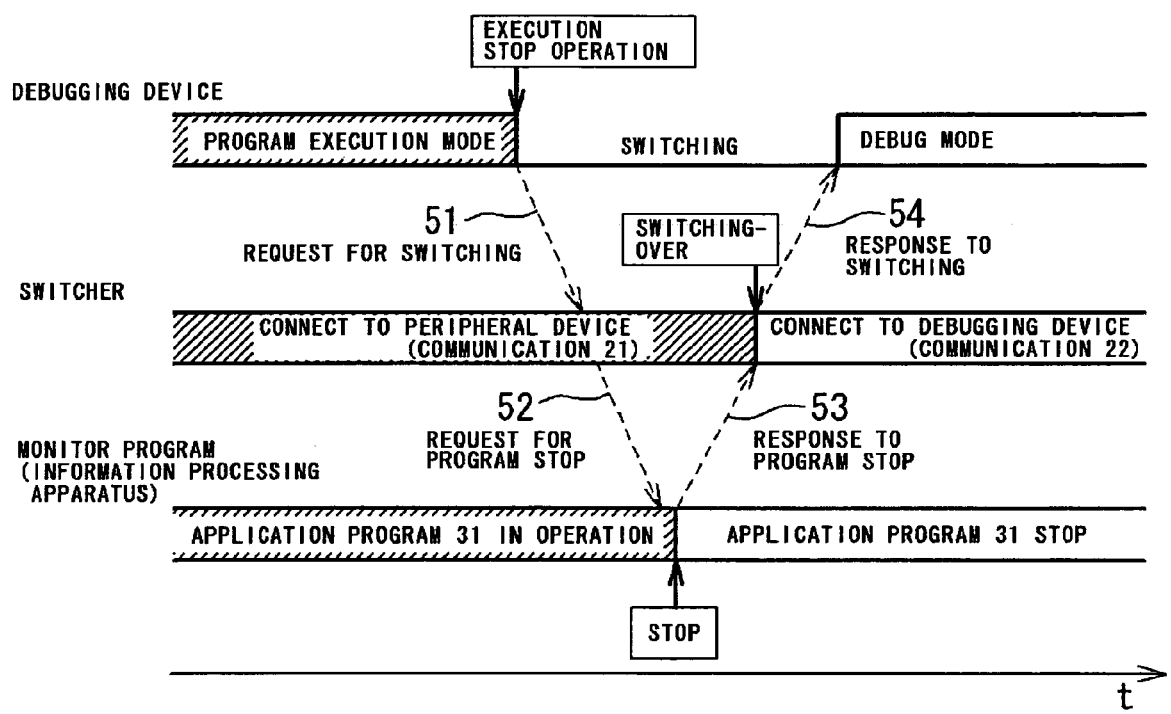
FIG. 6 is a timing chart showing the operation for transition from a program executing mode to a debug mode.

FIG. 6 depicts a timing chart showing the operation of the transition from the program executing mode to the debug mode. Such a case is shown here in which the transition occurs as a result of the user acting on the debugging device 3.

(1) In case the user has performed the operation of halting the operation of the application program 31 for the debugging device 3 ("execution stop operation" in the drawing), the debugger 35 of the debugging device 3 sends a signal 51 to the switch unit 5. The signal 51 denotes a switching request for connection of the serial communication and the status of the debugging device 3 (end of the program execution mode).

(2) On receipt of the signal 51, the controller 41 of the switch unit 5 outputs the signal directly to the information processing apparatus 1 as a signal 52. This signal 52 denotes a program stop request. The controller 41 causes the status of the debugging device 3 (end of the program execution mode) to be stored in the status memory storage unit 42.

(3) On receipt of the signal 52, the monitor program 32 of the information processing apparatus 1 halts the execution of the application program 31 ("stop" in the drawing). The monitor program 32 transmits a signal 53 to the switch unit 5 in order to advise the debugging device 3 of the fact that execution of the application program 31 has been stopped. The signal 53 denotes the response to the stop of program execution and the status of the information processing apparatus 1 ("application program 31 stop").

(4) On receipt of the signal 53, the controller 41 of the switch unit 5 transmits a switching signal 57 to the switch unit 43 to switch-over the connection of the serial communication from the information processing apparatus 1—peripheral device 2 (first mode of communication 21) to the information processing apparatus 1—debugging device 3 (second mode of communication 22). The controller 41 transmits a signal 54 to the debugging device 3. The signal 54 denotes the switching response ("response to switching"). The controller 41 stores the status of the information processing apparatus 1 ("application program 31 stop") in the memory storage unit 42.

(5) On receipt of the signal 54, the debugger 35 of the debugging device 3 recognizes the switching-over of the serial communication and the end of the stop of execution of the application program to transfer to the debug mode.

Figure 7:
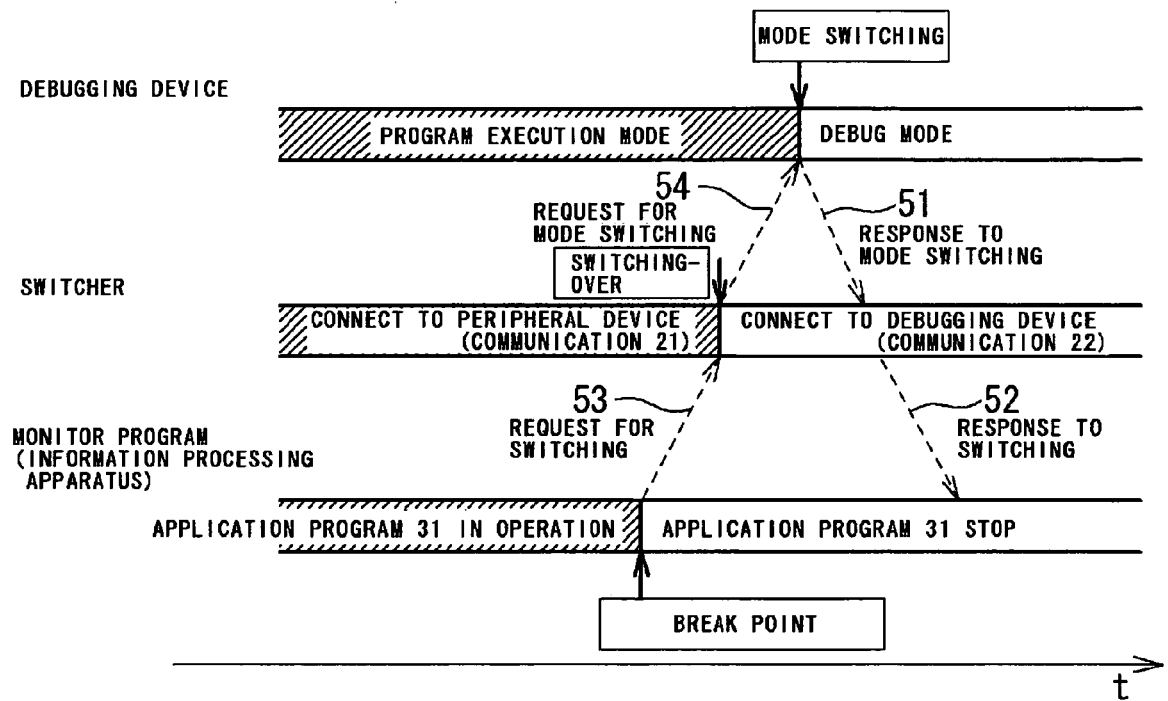
FIG. 7, continuing to FIG. 6, is a timing chart showing the operation for transition from a program executing mode to a debug mode.

FIG. 7 depicts a timing chart showing the operation of the transition from the program executing mode to the debug mode.

Such a case is shown here in which the transition occurs by a factor on the part of the information processing apparatus 1, such as a break point set in the application program 31.

(1) When the application program 31 comes to a standstill (break point in the drawing), the monitor program 32 of the information processing apparatus 1 transmits a signal 53 to the switch unit 5. The signal 53 indicates a switching request ("request for switching") and the status of the information processing apparatus 1 ("application program 31 stop").

(2) On receipt of the signal 53, the controller 41 of the switch unit 5 outputs a switching signal 57 to the switch unit 43 to switch-over the connection of the serial communication from the information processing apparatus 1—peripheral device 2 (first mode of communication 21) to the information processing apparatus 1—debugging device 3 (second mode of communication 22) ("switching-over" in the drawing). The controller 41 sends the signal 54 to the information processing apparatus 1. The signal 54 denotes a mode switching request. The controller 41 stores the state of the information processing apparatus 1 ("application program 31 stop") in the status memory storage unit 42.

(3) On receipt of the signal 54, the debugger 35 of the debugging device 3 transfers to the debug mode ("mode switching" in the drawing). The debugger 35 sends the signal 51 to the switch unit 5 in order to advise the monitor program 32 of completion of mode switching. The signal 51 indicates the mode switching response and the status of the debugging device 3 (stop of program execution mode).

(4) On receipt of the signal 51, the controller 41 of the switch unit 5 directly transmits the signal as signal 52 to the information processing apparatus 1. The signal 52 indicates the response to switching. The controller 41 stores the state of the debugging device 3 (stop of the program execution mode) in the status memory storage unit 42.

(5) On receipt of the signal 52, the monitor program 32 of the information processing apparatus 1 recognizes completion of transfer to the debug mode.

Figure 8:
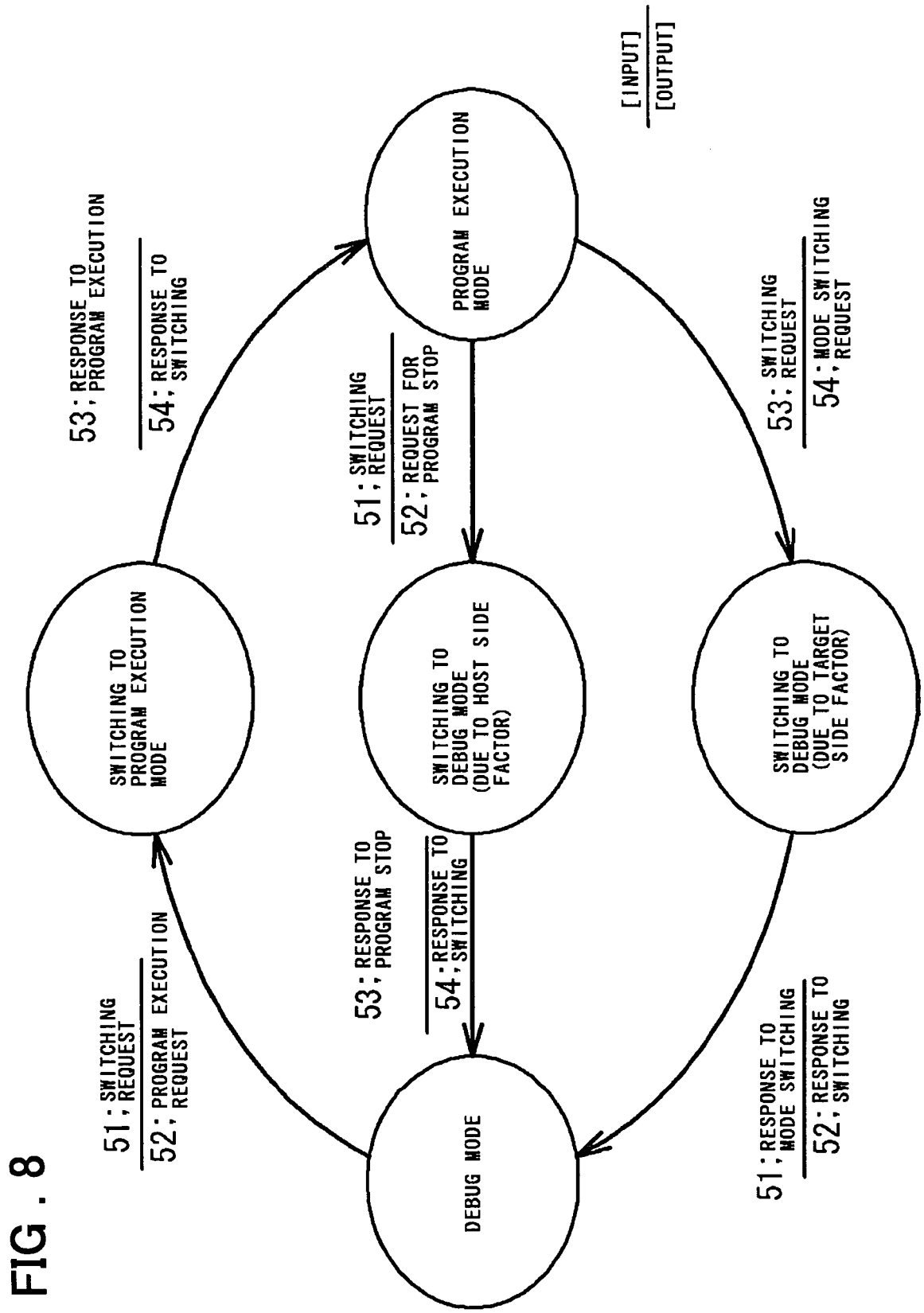
FIG. 8 is a status transition diagram of a switcher 5 explained with reference to FIGS. 5 to 7.

FIG. 8 depicts a status transition diagram of the switch unit 5, explained with reference to FIGS. 5 to 7. Within a circle mark is entered the status. On each arrow mark are entered an input (above) and an output (below) in the switch unit 5 at the time of the status transition. It is seen that, based on the respective signals, transition occurs through five statuses.

Figure 9:
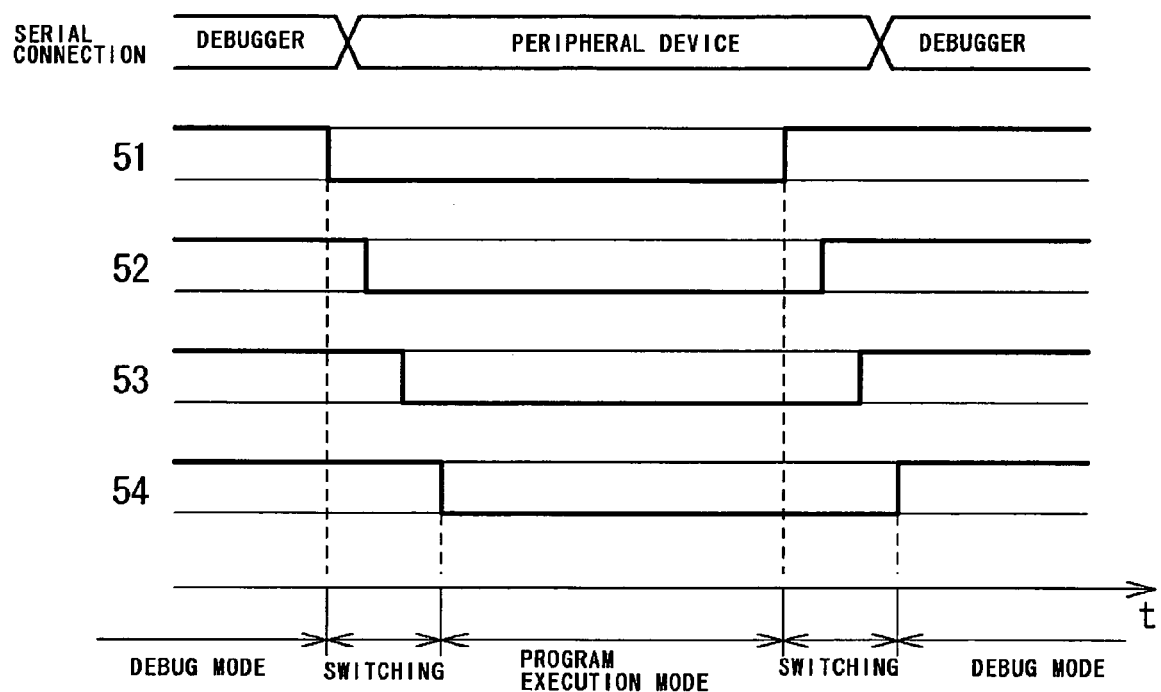
FIG. 9 is a timing chart showing the modes of respective signals.

FIG. 9 depicts a timing chart showing the modes of the respective signals at the time of transition from the debug mode through the program execution mode back to the debug mode by the debugger. In the figure, a high level and a low level denote the debug mode and the program execution mode, respectively. The figure shows a case of transition from the status of FIG. 5 to that of FIG. 6.

Figure 10:
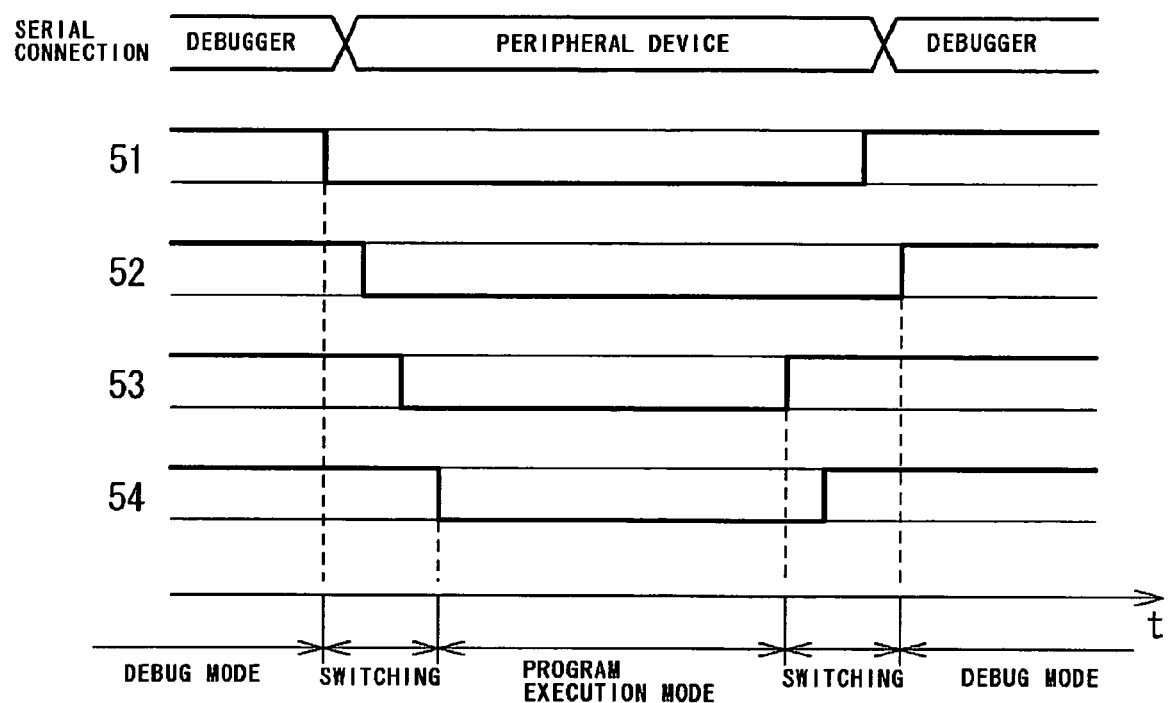
FIG. 10 is a timing chart showing the modes of respective signals.

FIG. 10 depicts a timing chart showing the mode of the respective signals at the time of transition from the debug mode through the program execution mode via break point back to the debug mode. In the figure, high and low levels denote the debug mode and the program execution mode, respectively. The figure shows a case of transition from the status of FIG. 5 to that of FIG. 7.

According to the present invention, the peripheral device 2 and the debugging device 3 are connected to the sole serial interface 11 as switching-over is made by the switch unit 5 between the peripheral device 2 and the debugging device 3. For switching, none of an additional serial interface or an interface dedicated to debugging, or CPU terminals connected to these interfaces, is required, with the result that the corresponding hardware costs are unneeded. The switch unit 5 added is independent from the information processing apparatus 1 and may be economically dismounted or re-used. The information processing apparatus 1, switch unit 5 and the debugging device 3 are interconnected solely by serial cables and may readily be installed or handled as compared to e.g., an in-circuit emulator.

Figure 11:
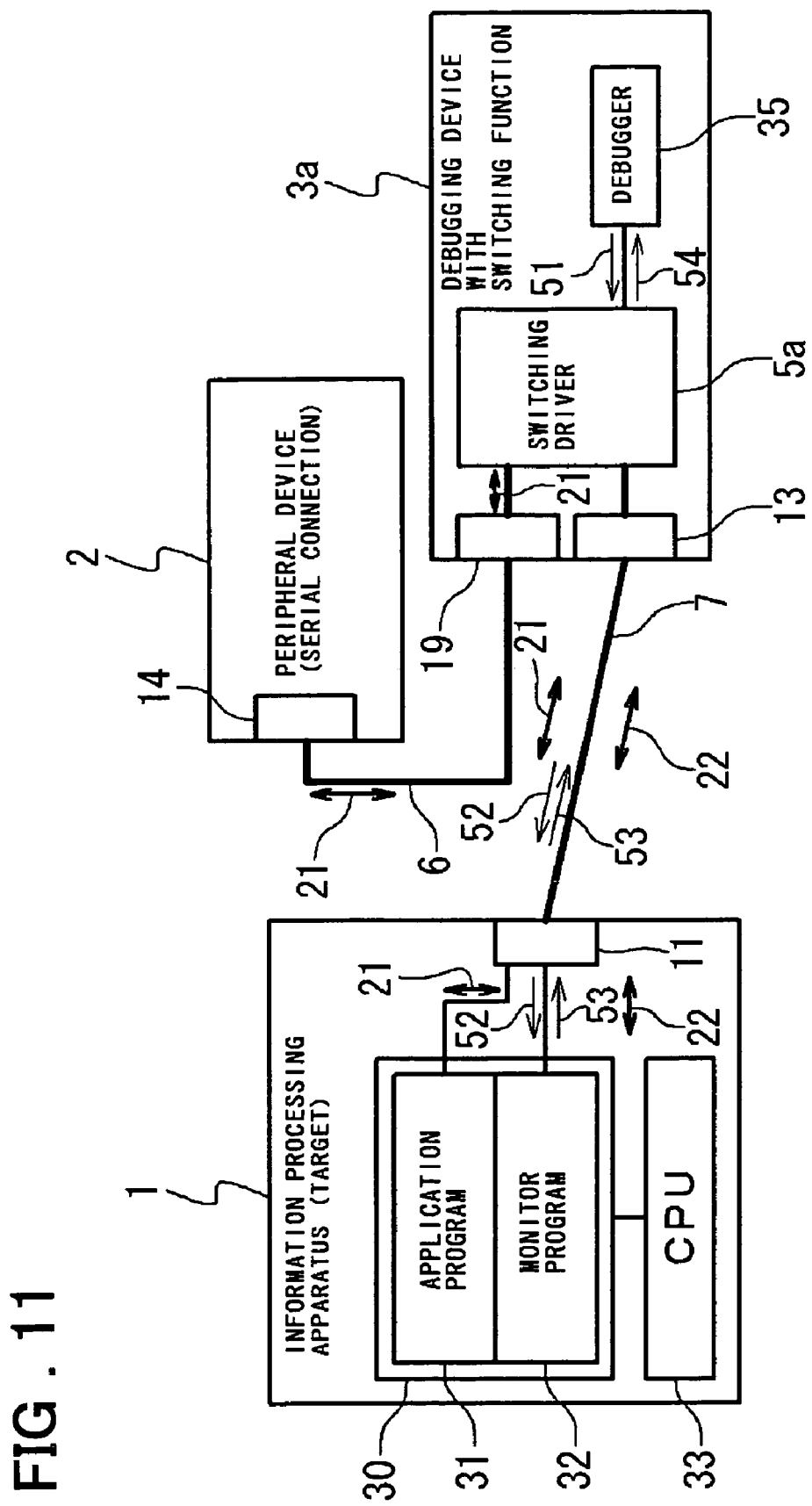
FIG. 11 is a block diagram showing the configuration of a modification of a switcher for debugging according to the present invention.

FIG. 11 depicts a block diagram showing a modification of the switcher for debugging according to the present invention. The parts or components which are the same as those of FIG. 3 are depicted by the same reference numerals and the corresponding explanation is omitted for simplicity. The mechanism for switching the serial connection (equivalent to the switch unit 5 of FIG. 3) is integrated to the switching function of the debugging device 3 to introduce a debugging device including a switching function 3*a*. With the debugging device with a switching function 3*a*, a serial switching driver 5*a*, equivalent to the switch unit 5 of FIG. 3, and the debugger 35, may be implemented by software setting. A serial switching driver 5*a* may be implemented by hardware, such as a board. A serial interface 19 is added on the debugging device with a switching function 3*a* for connection to the peripheral device 2. This configuration leads to communication switching operations wholly equivalent to those shown in FIG. 3.

In contrast to the switch unit 5 in FIG. 3, configured as hardware, the serial switching driver 5a is implemented by software. The serial interface 19, added to the debugging device with the switching function 3a, is simpler and less costly than the switch unit 5, thus enabling the cost to be reduced further.

The number of the serial cables, used for connection, is three in FIG. 3, while it can be reduced to two in the case of FIG. 11, thus assuring facilitated mounting and handling as well as reduced cost. In case a standard which renders it physically difficult to provide signal lines for signals 52, 53, such as USB, is used as serial interface 19, the signals 52, 53 may logically be implemented by providing the regulations for encoding the communication between the monitor program 32 and the serial switching driver 5a and superposing the so encoded communication on the serial communication. The present invention can be carried out even in such case.

According to the present invention, described above, no additional serial interface is needed on the target information processing apparatus. No interfaces dedicated for debugging are needed and the number of terminals of the CPU may be reduced. In addition, the hardware cost may be reduced, while the debugging system may be mounted and handled readily.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A switcher for debugging used for testing an information processing apparatus, said switcher comprising:
   a plurality of first terminals connectable to a plurality of first conductors, belonging to a first cable;
   a plurality of second terminals connectable to a plurality of second conductors, belonging to a second cable;
   a third terminal connectable to a third cable;
   a controller connected to at least one first terminal for command, as at least one of said plural first terminals, and to at least one second terminal for command, as at least one of said plural second terminals, and
   a switch unit connected to a first terminal for test, as at least one other of said plural first terminals, to a second terminal for test, as at least one other of said plural second terminals, and to said third terminal;
   said controller outputting an output information, based on an input information from one of said first terminal for command and said second terminal for command, to control switching connection of said switch unit;
   said switch unit connecting one of said first terminal for test and said third terminal to said second terminal for test based on said control information.

2. The switcher for debugging as defined in claim 1 wherein
   when one end of said second cable is connected to a first information processing apparatus being tested, the other end thereof is connected to said plural second terminals, one end of said first cable is connected to a test device, the other end thereof is connected to said plural first terminals, one end of said third cable is connected to a second information processing apparatus, involved in testing, the other end thereof is connected to said third terminal, and said first information processing apparatus is tested by said test device using said second information processing apparatus,
   said controller transmits a first transmission information to said first information processing apparatus, through said second terminal for command and said second cable, based on a first received information received from said test device through said first cable and the first terminal for command, to output a first switching information controlling the switching connection of said switch unit;
   said switch unit connecting one of said first terminal for test and said third terminal to said second terminal for test, based on said first switching signal;
   said first received information comprising an information pertinent to connection of said switch unit; and
   said first transmission information comprising an information pertinent to operation of said first information processing apparatus.

3. The switcher for debugging as defined in claim 2 wherein
   in testing said first information processing apparatus, said controller transmits a second transmission information to said test device, through said first terminal for command and said first cable, based on a second received information received from the first information processing apparatus over the second cable and the second terminal for command, said second received information comprises an information representing a response to the first transmission information and said second transmission information comprises an information representing a response to the second received information.

4. The switcher for debugging as defined in claim 1 wherein
   in testing said first information processing apparatus, using the second information processing apparatus, by the test device, as one and the other ends of the second cable are connected to the first information processing apparatus being tested and to said plural second terminals, respectively, one and the other ends of the first cable are connected to the test device and to said plural first terminals, respectively, and as one and the other ends of a third cable are connected to the second information processing apparatus involved in testing and to the third terminal, respectively,
   the controller sends the first transmission information, through the second terminal for command and the second cable, to the first information processing apparatus, based on the first received information received from the test device via first cable and first terminal for command;
   the first received information comprises the information pertinent to switching connection to the switch unit; and
   the first transmission information comprises the information pertinent to the operation of the first information processing apparatus.

5. The switcher for debugging as defined in claim 1 wherein
   in testing said first information processing apparatus, the controller sends a second transmission information through said first terminal for command and said first cable to said test device, based on a second received information received from the first information processing apparatus over said second cable and said second terminal for command, to output a first switching information controlling the switching connection of the switch unit;

said switch unit connects one of said first terminal for test and said third terminal to said second terminal for test, based on said first switching information;

said second received information comprises an information representing a response to the first transmission information; and said second transmission information comprises an information representing the response to the second received information.

6. The switcher for debugging as defined in claim 1 wherein in testing the first information processing apparatus, using the second information processing apparatus by the test device, as one and the other ends of said second cable are connected to the first information processing apparatus being tested and to the plural second terminals, respectively, one and the other ends of said first cable are connected to said test device and to the plural first terminals, respectively, and as one and the other ends of said third cable are connected to a second information processing apparatus, involved in testing, and to the third terminal, respectively, said controller sends the second transmission information, through the first terminal for command and the first cable, to said test device, based on a second received information, received from the first information processing apparatus, over said first cable and the second terminal for command, to output the first switching information controlling the switching connection of the switch unit;

said switch unit connects one of the first terminal for test and the third terminal to the second terminal for test, based on the first switching information;

said second received information comprises an information pertinent to the switching connection of the switch unit; and said second transmission information comprises an information for controlling operation of the test device.

7. The switcher for debugging as defined in claim 1 wherein in testing the first information processing apparatus, said controller sends a first transmission information through the second terminal for command and the second cable to the first information processing apparatus, based on a first received information received from the test device over the first cable and the first terminal for command;

said first received information comprises an information representing a response to a second transmission information; and said first transmission information comprises an information representing a response to the first received information.

8. The switcher for debugging as defined in claim 1 wherein said switcher for debugging is comprised in the second information processing apparatus.

9. A debugging method for a debugging device debugging an information processing apparatus connected to a peripheral device, wherein said peripheral device and the debugging device are connected to said information processing apparatus via a switch unit; said information processing apparatus comprises an application program being debugged and a monitor program for controlling the debugging in the information processing apparatus;

said debugging device comprises a debugger for controlling the debugging; and said switch unit comprises a controller for selecting one of a first connection between the information processing apparatus and the peripheral device and a second connection between the information processing apparatus and the debugging device;

said debugging method comprising:

(a) a step of the debugger in a debug mode transmitting a first request signal, indicating a switching connection request to the switch unit based on a start request signal indicating a request for start of operation of an application program;

(b) a step of the controller switching-over from a second connection to a first connection based on a first request signal;

(c) a step of the controller transmitting a second request signal, indicating a request for execution of the application program, to the information processing apparatus;

(d) a step of a monitor program starting execution of the application program based on a second request signal;

(e) a step of the monitor program transmitting a first response signal, indicating start of execution of the application program, to the switch unit;

(f) a step of the controller transmitting a second response signal, indicating switching-over, to the debugging device, based on the first response signal; and (g) a step of the debugger transferring to the program executing mode based on the second response signal;

said debug mode being a mode of the debugger debugging the information processing apparatus; and said program executing mode being a mode of the application program being in operation.

10. A debugging method for debugging an information processing apparatus connected to a peripheral device, by a debugging device, wherein said peripheral device and the debugging device are connected via a switch unit to said information processing apparatus;

said information processing apparatus comprises an application program being debugged and a monitor program for controlling debugging in the information processing apparatus;

said debugging device comprises a debugger for controlling the debugging;

said switch unit includes a controller for selecting one of a first connection between the information processing apparatus and a peripheral device and a second connection between the information processing apparatus and a debugging device;

the debugging method comprising:

(a) a step of said debugger in a program executing mode transmitting a first request signal, indicating a switching connection request to said switch unit, based on a stop request signal indicating a request for stop of the application program;

(b) a step of said controller transmitting a second request signal representing a stop request for stopping execution of the application program, based on a first request signal;

(c) a step of said monitor program stopping execution of the application program, based on a second request signal;

(d) a step of the monitor program transmitting a first response signal, indicating stop of execution of the application program, to the switch unit;

(e) a step of the controller switching from a first connection to a second connection based on the first response signal;

(f) a step of the controller transmitting a second response signal, indicating switching-over, to the debugging device; and (g) a step of the debugger transferring to a debug mode based on the second response signal;

said debug mode being a mode of the debugger debugging the information processing apparatus; and said program executing mode being a mode of the application program being in operation.

11. A debugging method for debugging an information processing apparatus, connected to a peripheral device, by a debugging device, wherein said peripheral device and the debugging device are connected via a switch unit to said information processing apparatus;

said information processing apparatus includes an application program being debugged and a monitor program for controlling a debugging in the information processing apparatus;

said debugging device comprises a debugger for controlling a debugging;

said switch unit comprises a controller for selecting one of a first connection between the information processing apparatus and the peripheral device and a second connection between the information processing apparatus and the debugging device; and said debugging method comprises:

(a) a step of a monitor program transmitting a first request signal, indicating a switching connection request, to the switch unit responsive to stop of the application program;

(b) a step of the controller switching-over from the first connection to the second connection based on a first response signal;

(c) a step of the controller transmitting a second request signal, indicating a request for mode change of the debugger, to the information processing apparatus;

(d) a step of the debugger changing from a program running mode to a debug mode based on the second request signal;

(e) a step of the debugger transmitting a first response signal, indicating said mode change, to the switch unit;

(f) a step of the controller transmitting a second response signal, indicating said mode change, to the information processing apparatus, based on the first response signal; and (g) a step of the monitor program recognizing completion of transfer to the debug mode;

said debug mode being a mode of the debugger debugging the information processing apparatus; and said program executing mode being a mode of the application program being in operation.

* * * * *